United States Patent
Vance

(10) Patent No.: US 8,095,081 B2
(45) Date of Patent: Jan. 10, 2012

(54) DEVICE AND METHOD FOR HANDS-FREE PUSH-TO-TALK FUNCTIONALITY

(75) Inventor: Scott LaDell Vance, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1541 days.

(21) Appl. No.: 10/709,345

(22) Filed: Apr. 29, 2004

(65) Prior Publication Data
US 2005/0245203 A1 Nov. 3, 2005

(51) Int. Cl.
*H04B 1/38* (2006.01)

(52) U.S. Cl. ... 455/90.2; 455/79; 455/569.1; 455/575.2; 379/431; 381/370; 381/375; 381/376; 704/270; 704/271

(58) Field of Classification Search .................. 455/90.2, 455/79, 569.1, 575.2; 379/431; 381/370, 381/375, 376; 704/270, 271
See application file for complete search history.

(56) References Cited

U.S. PATENT DOCUMENTS

| | | | | |
|---|---|---|---|---|
| 3,586,798 A | * | 6/1971 | Holmes | 200/52 R |
| 3,746,789 A | * | 7/1973 | Alcivar | 379/175 |
| 4,187,532 A | | 2/1980 | Naffier | |
| 4,426,733 A | * | 1/1984 | Brenig | 455/79 |
| 5,101,504 A | * | 3/1992 | Lenz | 455/78 |
| 6,016,347 A | * | 1/2000 | Magnasco et al. | 379/430 |
| 6,236,969 B1 | * | 5/2001 | Ruppert et al. | 704/275 |
| 6,594,632 B1 | * | 7/2003 | White | 704/270 |
| 7,300,178 B2 | | 11/2007 | Helou | |
| 2003/0018475 A1 | * | 1/2003 | Basu et al. | 704/270 |
| 2004/0022395 A1 | * | 2/2004 | Turnbull | 381/74 |
| 2004/0243416 A1 | * | 12/2004 | Gardos | 704/275 |
| 2005/0085252 A1 | * | 4/2005 | Reyes | 455/519 |
| 2005/0136848 A1 | * | 6/2005 | Murray | 455/79 |
| 2007/0004464 A1 | * | 1/2007 | Lair et al. | 455/569.1 |

FOREIGN PATENT DOCUMENTS

| | | |
|---|---|---|
| GB | 1194089 | 6/1970 |
| GB | 1 194 089 | 8/1970 |
| JP | 2002141981 | 10/2000 |
| JP | 2002101981 A | 4/2002 |
| WO | 0163888 A1 | 8/2001 |
| WO | 2004011275 A1 | 2/2004 |

OTHER PUBLICATIONS

PCT International Search Report for related PCT application, PCT/US2004/034135 dated Mar. 8, 2005.
PCT Written Opinion of the International Searching Authority for related PCT application PCT/US2004/034135 dated Mar. 8, 2005.
State Intellectual Property Office, P.R. China; Second Office Action; Oct. 9, 2010; issued in Chinese Patent Application No. 200480042157.5.
Japan Patent Office, Official Action, Jul. 31, 2008.

(Continued)

*Primary Examiner* — Wen Huang
(74) *Attorney, Agent, or Firm* — Sreenivas Vedantam; Moore & Van Allen, PLLC

(57) ABSTRACT

A device for hands-free push-to-talk functionality may include a push-to-talk sensor or switch operable by at least one of a preset audible signal, a predetermined movement of the sensor or switch, air pressure or the like. The device may also include means to control operation of a communications device in response to signals from the push-to-talk sensor or switch.

26 Claims, 5 Drawing Sheets

OTHER PUBLICATIONS

State Intellectual Property Office, P.R. China, Office Action, Dec. 11, 2009, pp. 1-11, Beijing, China.

State Intellectual Property Office, P.R. China; Decision on Rejection; Jul. 4, 2011; Chinese Patent Application No. 200480042157.5.

* cited by examiner $F_g$ = Force (Gravity)

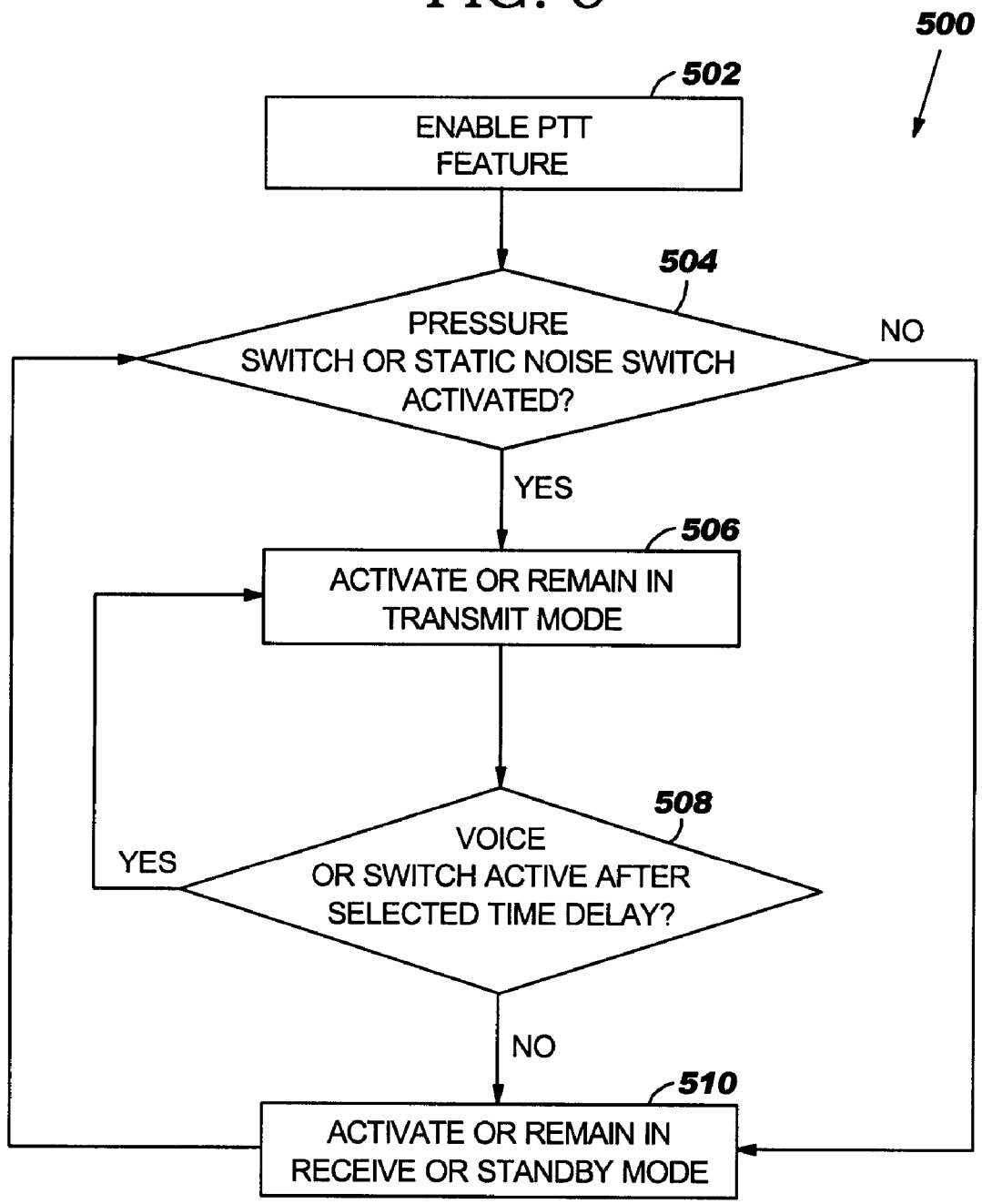

DEVICE AND METHOD FOR HANDS-FREE PUSH-TO-TALK FUNCTIONALITY

BACKGROUND OF INVENTION

The present invention relates to communications devices and more particularly to a device and method for hands-free push-to-talk functionality associated with a communications device.

Walkie-talkie or push-to-talk type communications services are becoming more widely available from communications service providers, as communication standards are being adapted to provide such functionality or services. Walkie-talkie communication service have many advantages including lower cost because such service, while typically involving a flat monthly fee, may not be charged against a user's monthly airtime minutes allotted by the user's particular subscription plan. Additionally, the service does not typically require that phone numbers have to be dialed and multiple parties can usually talk to one another simultaneously.

These services operate using push-to-talk (PTT) functionality. That is, a user must push and hold a button to be in a speaking or transmit mode and must release the button to switch to a receive or listen mode. Accordingly, to conduct a two-way conversation, the user must be continually pushing and releasing the PTT button. This may be a nuisance or inconvenient, particularly under some circumstances when a user is involved in an activity that does not permit the user to perform such actions or requires the user to use both hands.

SUMMARY OF INVENTION

In accordance with an embodiment of the present invention, a device for hands-free push-to-talk functionality may include a push-to-talk sensor or switch operable by at least one of a preset audible signal, a predetermined movement of the sensor or switch, or air pressure. The device may also include means to control operation of a communications device in response to signals from the push-to-talk sensor or switch.

In accordance with another embodiment of the present invention, a communications device including a hands-free push-to-talk functionality may include a push-to-talk sensor or switch operable by at least one of a preset audible signal, a predetermined movement or air pressure. The communications device may also include a processor to control operation of the communications device in response to signals from the push-to-talk sensor or switch.

In accordance with another embodiment of the present invention, a method for hands-free push-to-talk functionality may include detecting at least one of a preset audible signal, a predetermined movement, or air pressure. The method may also include controlling operation of a communications device in response to detecting a presence or absence of at least one of the preset audible signal, the predetermined movement, or air pressure.

In accordance with another embodiment of the present invention, a method of making a device for hands-free push-to-talk functionality may include providing a push-to-talk sensor or switch operable by at least one of a preset audible signal, a predetermined movement of the sensor or switch, or air pressure. The method may also include providing means to control operation of a communications device in response to signals from the push-to-talk sensor or switch.

In accordance with another embodiment of the present invention, a computer-readable medium having computer-executable instructions for performing a method may include detecting at least one of a preset audible signal, a predetermined movement, or air pressure. The method may also include controlling operation of a communications device in response to detecting a presence or absence of at least one of the preset audible signal, the predetermined movement, or air pressure.

BRIEF DESCRIPTION OF DRAWINGS

FIG. 5 is a flow chart of a method for hands-free push-to-talk functionality in accordance with another embodiment of the present invention.

DETAILED DESCRIPTION

The following detailed description of preferred embodiments refers to the accompanying drawings, which illustrate specific embodiments of the invention. Other embodiments having different structures and operations do not depart from the scope of the present invention.

Figure 1:
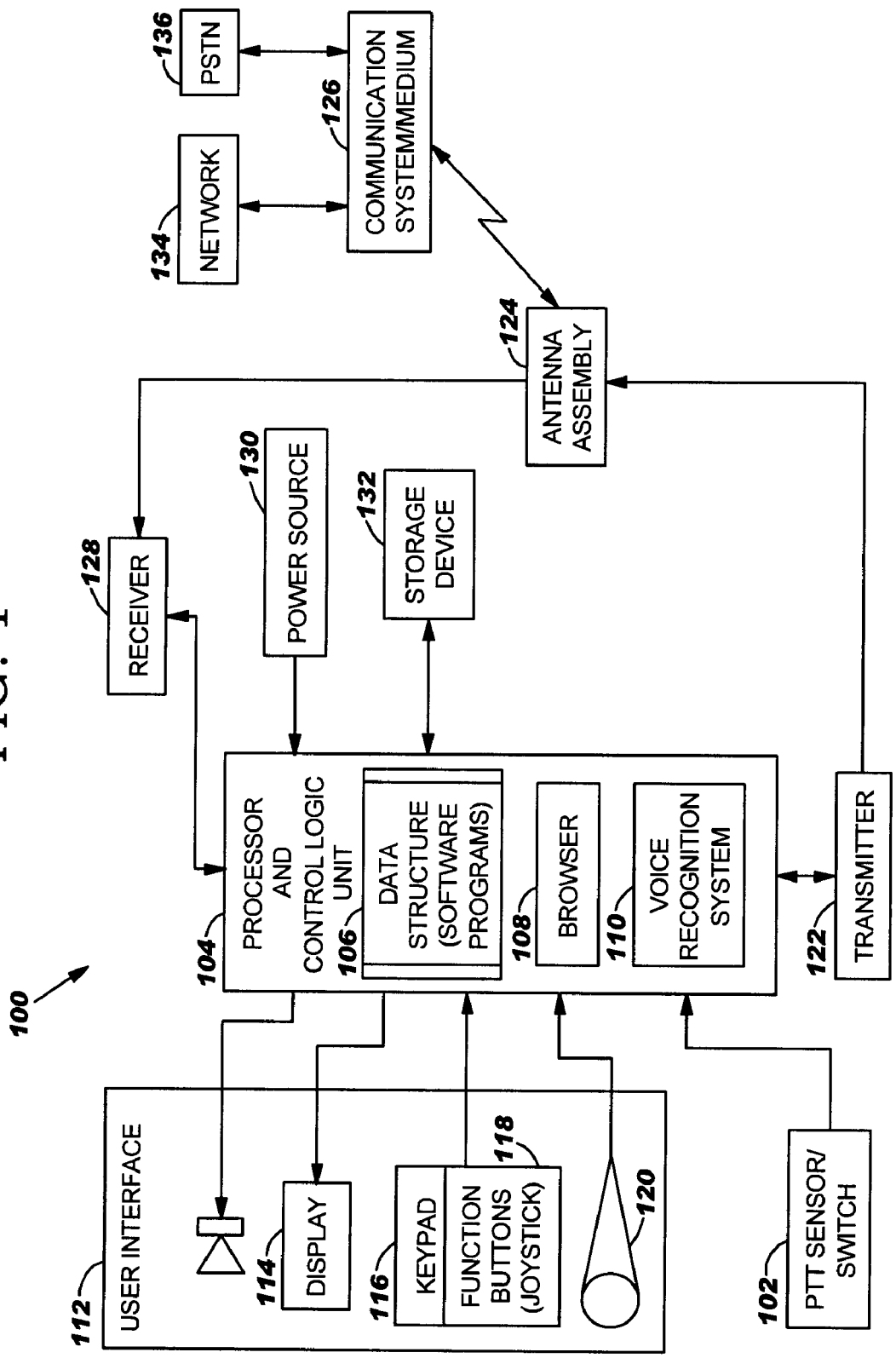
FIG. 1 is a block schematic diagram of an example of a communications device including a hand-free push-to-talk functionality in accordance with an embodiment of the present invention.

FIG. 1 is a block schematic diagram of an example of a communications device 100 including a hand-free push-to-talk (PTT) device 102 or functionality in accordance with an embodiment of the present invention. The PTT device 102 may be a PTT switch or sensor operable by at least one of a preset audible signal, a predetermined movement of the sensor or switch, air pressure or the like. Examples of the PTT device 102, sensor or switch may include, but is not limited to, an audible signal detector, an accelerometer, a tilt sensor, a pressure sensitive switch or air sensitive switch, or similar devices. Examples of an accelerometer or tilt sensor may include a Kionix® model KXG20 accelerometer, an Analog Devices® ADXL05 accelerometer, a Motorola® MMA1260D accelerometer, an electrolytic tilt sensor or the like. An example of a pressure sensitive switch or air pressure sensitive switch is a Microelectromagnetic Systems (MEMS) pressure sensor as manufactured by Intpax of San Jose, Calif. or a similar sensor.

The communications device 100 may include a processor and control logic unit 104. The PTT sensor or switch 102 may be coupled to the processor and control logic unit 104 to control operation of the communications device 100 or to send signals to the communications device 100 to control operation thereof, as will be discussed in more detail herein. The processor and control logic unit 104 may be a microprocessor or the like. The processor and control logic unit 104 may include data structures or software programs 106 including computer-executable or computer-readable instructions to control operation of the communications device 100 and its components. The data structure or software programs 106 may include computer-executable instructions for carrying out the PTT functionality as described in more detail herein. The processor and control logic unit 104 may also include a browser 108 and voice recognition system 110.

The communications device 100 may include an operator or user interface 112 to facilitate controlling operation of the communications device 100 including initiating and conducting phone calls and other communications. The user interface 112 may include a display 114 to provide visual signals to a subscriber or user as to the status and operation of the communications device 100. The display 114 may be a liquid crystal display (LCD) or the like capable of presenting color images. The display 114 may provide information to a user or operator in the form of images, text, numerals, characters, a graphical user interface (GUI) and the like. The user interface 112 may also include a keypad 116 and function keys or buttons 118 including a point device, such as a joystick or the like. The keypad 116, function buttons and joystick 118 permit the user to communicate commands to the communications device 100 to dial phone numbers, initiate and terminate calls, establish other communications, such as access to the Internet, send and receive email, text messages and the like. The keypad 116, function buttons and joystick 118 may also be used to control other operations of the communications device 100, for example, enable special functions, such as the PTT functionality or feature.

The user interface 104 may also include a microphone 120 and a speaker 122. The microphone 120 may receive audio or acoustic signals from a user or from an acoustic source, such as a radio, television or the like. The microphone 120 may convert the audio or acoustic signals to electrical signals. The microphone 120 may be connected to the processor and logic unit 104 wherein the processor and logic unit 112 may convert the electrical signals to baseband communication signals. The processor and control logic unit 104 may be connected to a transmitter 122 that may convert baseband signals from the main processor and control logic unit 112 to radio frequency (RF) signals. The transmitter 122 may be connected to an antenna assembly 124 for transmission of the RF signals to a communication medium or system 126.

The antenna assembly 124 may receive RF signals over the air and transfer the RF signals to a receiver 128. The receiver 128 may convert the RF signals to baseband signals. The baseband signals may be applied to the processor and control logic unit 104 which may convert the baseband signals to electrical signals. The processor and control unit 104 may send the electrical signals to a speaker 118, which may convert the electrical signals to audio signals that can be understood by the user.

A power source 130 may be connected to the processor and control logic unit 104 to provide power for operation of the communications device 100. The power source 130 may be a rechargeable battery or the like. The communications device 100 may also include at least one data storage device 132. The data storage device 132 may store lists of phone numbers. Examples of the lists may include phone numbers entered and stored by action of the user, such as in a phonebook portion of the storage device 132, phone numbers for calls that have been missed or not answered, phone numbers that have been called by the communications device 100 and the like. The data storage device 132 may be a computer-readable medium to store computer-executable or computer-usable instructions or data structures, such as data structures 106, to perform special operations or functions such as those described in accordance with embodiments of the present invention.

The communications device 100 may be operable in association with a communications system or medium 126 in accordance with an embodiment of the present invention. The communications system or medium 126 may be a mobile, wireless, cellular communications system or similar system. The communications system 126 may couple the communications device 100 to another communication network 134 or to a public switched telephone network 136.

The communications device 100 may be a cordless telephone, cellular telephone, personal digital assistant (PDA), communicator, computer device or the like and is not unique to any particular communication standard, such as Advanced Mobile Phone Service (AMPS), Digital Advanced Mobile Phone Service (D-AMPS), Global System for Mobile Communications (GSM), Code Division Multiple Access (CDMA), Time Division Multiple Access (TDMA) or the like. The layout and design illustrated in FIG. 1 is for purposes of explaining the present invention and the present invention is not limited to any particular design. While the communications device 100 illustrated in FIG. 1 is a wireless communications device, the present invention may also be applicable to wired or hard wired communication devices and systems.

Figure 2:
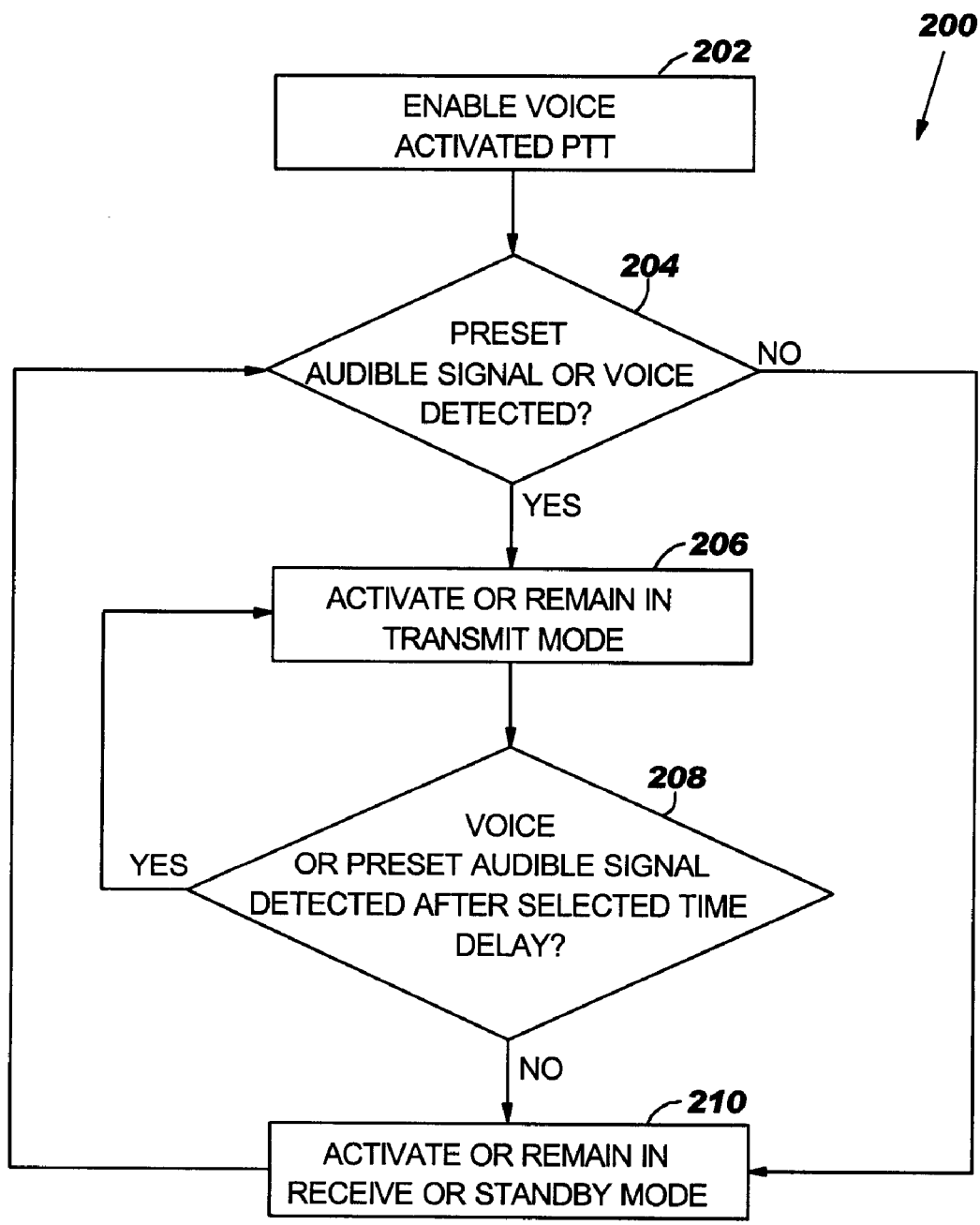
FIG. 2 is a flow chart of a method for hands-free push-to-talk functionality in accordance with an embodiment of the present invention.

FIG. 2 is a flow chart of a method 200 for hands-free push-to-talk (PTT) operation or functionality in accordance with an embodiment of the present invention. Elements and features of the method 200 may be embodied in or performed by the communications device 100 and PTT sensor or switch 102. In block 202, a voice activated PTT functionality may be enabled. In block 204, a determination may be made if a preset audible signal or voice signal has been detected. The preset audible sound or voice signal may be a predetermined sound expected to be received to activate the PTT function. The preset audible sound or voice signal may also be a predetermined keyword or words, series of numbers or combination of words, numbers or sounds. The preset audible sound or voice signal may be received by a microphone and voice recognition system associated with the communication device, similar to the microphone 120 and voice recognition system 110 of FIG. 1 or by a separate audible sensor or switch, such as the PTT sensor or switch 102 in FIG. 1. If the preset audible signal or voice signal is not detected in block 204, the method 200 may advance to block 210. In block 210, the communication device may remain in a receive or standby mode. If the preset audible signal or voice signal is detected in block 204, the method 200 may advance to block 206.

In block 206, a transmit mode may be activated by the communication device in response to the preset audible signal or voice signal. In block 208, a determination may be made if voice or the preset audible signal is detected after a selected time delay. If voice or the preset audible signal is detected after the selected time delay, the method 200 may return to block 206 and the transmit mode may remain active. If voice or the preset audible signal is not detected after the selected time delay, the method 200 may advance to block 210. In block 210, the receive or standby mode may be activated for the communication device to receive incoming signals. The method 200 may then return to block 204 when a preset audible signal or voice is detected and the method 200 may proceed as just described until the enable voice PTT is inactivated or the communications device is turned off.

Figure 3:
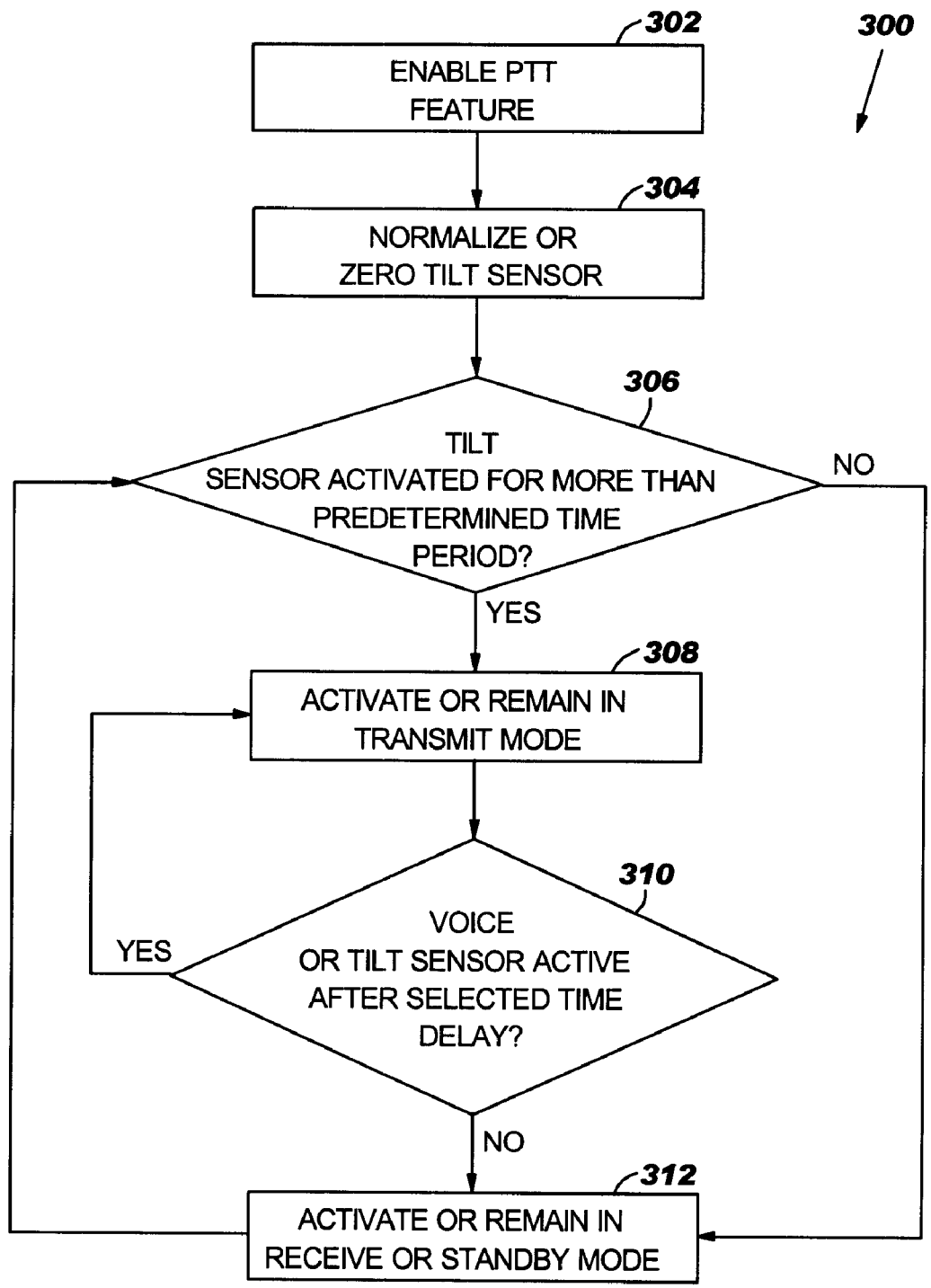
FIG. 3 is a flow chart of a method for hands-free push-to-talk functionality in accordance with another embodiment of the present invention.

FIG. 3 is a flow chart of a method 300 for hands-free push-to-talk (PTT) functionality in accordance with another embodiment of the present invention. Elements and features of the method 300 may be embodied in or performed by the communications device 100 and PTT sensor or switch 102 in FIG. 1. In block 302 the PTT feature or function may be enabled. In block 304, a tilt sensor may be normalized or zeroed. The tilt sensor may be the similar to the tilt sensor described with respect to the PTT sensor or switch 102 of FIG. 1. In block 306, a determination may be made if the tilt sensor is activated for more than a predetermined time period. If the tilt sensor is not activated for more than the predetermined time period, the method 200 may advance to block 312. In block 312, the communication device may remain in a receive or standby mode in response to the tilt sensor not being active for more than the predetermined time period. If the tilt sensor is activated for more than the predetermined time period in block 306, the method 200 may advance to block 308. In block 308, the transmit mode may be activated by the communication device in response to the tilt sensor being activated for more than the predetermined time period. The tilt sensor may be activated to cause the transmit mode of the communication device to be active in response to the tilt sensor being tilted more than a predetermined angle relative to a normalized angle for more than the predetermined time duration. Alternatively, in block 308, the communications device may remain in a transmit mode if already in the transmit mode.

In block 310, a determination may be made if voice is detected or if the tilt sensor is still active or tilted more than the predetermined angle relative to the normalized angle after a selected time delay. If voice is detected or the tilt sensor is active, the method 200 may return to block 308 and the communications device may remain in the transmit mode. If voice or the tilt sensor is not active after the selected time delay in block 310, the method 300 may advance to block 312. In block 312, the communication device may switch to a receive or standby mode in response to voice or the tilt sensor not being active after the selected time delay. The method 300 may return to block 306 in response to the tilt sensor being active or tilted more than the predetermined angle for more than the predetermined time period and the method 300 may proceed as just described.

Figure 4A:
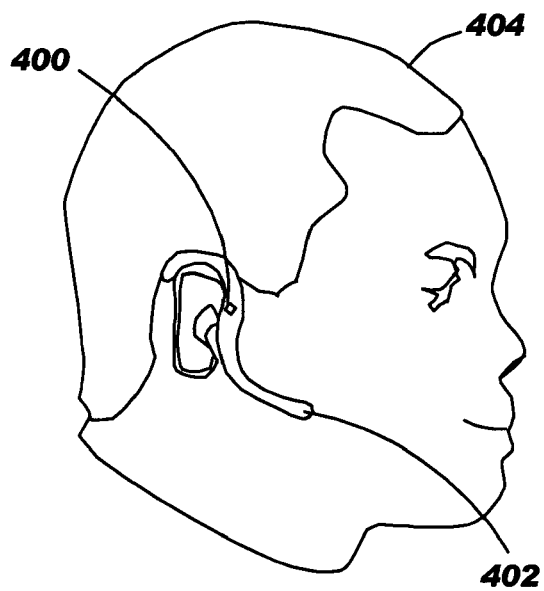
FIG. 4A is an example of a device for hands-free push-to-talk operation or functionality shown mounted in a headset in accordance with an embodiment of the present invention.
Figure 4B:
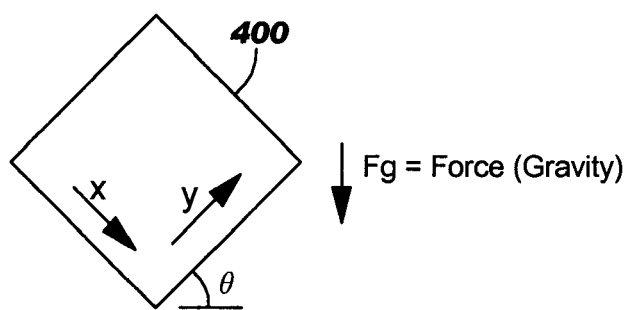
FIG. 4B is a detailed view of the hands-free push-to-talk device of FIG. 4A.

FIG. 4A is an example of a device 400 for hands-free push-to-talk operation or functionality shown mounted in a headset 402 in accordance with an embodiment of the present invention. FIG. 4B is a detailed view of the hands-free push-to-talk (PTT) device 400 of FIG. 4A. The PTT device 400 may be an accelerometer or tilt sensor and may operate in conjunction with the method 300 just described or used for the PTT sensor 102 in FIG. 1. As previously described, examples of an accelerometer or tilt sensor that may be used for PTT device 400 may include a Kionix® model KXG20 accelerometer, an Analog Devices® ADXL05 accelerometer, a Motorola® MMA1260D accelerometer, an electrolytic tilt sensor or the like. When a user 404 or wearer of the headset 402 tilts his head more than a predetermined angle from a zero or normalized angle for more than a predetermined time period or duration, the PTT device 400 or feature may be activated and the communications device may be switched to a transmit mode to transmit voice communications spoken by the user 404. As an example, assume a zero or normalized angle theta (θ) equal to about 45 degrees. The outputs of the tilt sensor 400 in the X and Y orientation depicted in FIG. 4B may be represented by the equations:

$$O_{(X)} = KF_g \cos\theta \quad \text{Eqn. 1}$$

$$O_{(Y)} = KF_g \sin\theta \quad \text{Eqn. 2}$$

Where K is some constant and F is the force due to gravity. An example of the output for different angles theta θ may be represented in the following table, assuming for purposes of explanation that KF equals one:

| THETA (θ) | $O_{(X)}$ | $O_{(Y)}$ |
| --- | --- | --- |
| 45° | .71 | .71 |
| 35° | .82 | .57 |
| 55° | .57 | .82 |

Accordingly, if the PTT device 400, tilt sensor or accelerometer is tilted about 10 degrees or more from the normalized or zeroed angle of about 45 degrees for a predetermined time period or duration, the PTT function may be activated and a communications device coupled to or associated with the tilt sensor or PTT device 400 may be placed in a transmit mode. While shown being mounted in a headset 402, the PTT device 400 may be in any accessory or other component associated with the communication device that may facilitate the PTT functionality.

FIG. 5 is a flow chart of a method 500 for hands-free push-to-talk (PTT) functionality in accordance with another embodiment of the present invention. Elements and features of the method 500 may be embodied in or performed by the communications device 100 and PTT sensor or switch 102 in FIG. 1. In block 502, the PTT feature may be enabled. In block 504, a determination may be made if a pressure switch or static noise switch has been activated. The pressure switch or static noise switch may be activated by a user blowing on the sensor or making a predetermined sound to perform the PTT function. The pressure switch or static noise switch may correspond to the PTT sensor or switch 102 in FIG. 1. If the pressure switch or static noise switch has not been activated in block 504, the method 500 may advance to block 510 and the communication device may activate or remain in a receive or standby mode. If the pressure switch or static noise switch has been activated in block 504, the method 200 may advance to block 506. In block 506, the communication device may activate or be switched to a transmit mode in response to the pressure switch detecting an air pressure greater than a preset air pressure. A transmit mode may be activated in the associated communications device in response to detecting the air pressure greater than the preset air pressure.

In block 508, a determination may be made if voice is detected or if the pressure switch or static noise switch are active by detecting a pressure greater than a preset pressure after a selected time delay. If voice is detected or the switch is active after the selected time delay, the method may return to block 506 and the communication device may remain in the transmit mode. If voice is not detected or the switch is not active after the selected time delay, the method 200 may advance to block 510. As previously described, in block 510, the communication device may activate or remain in a receive or standby mode. From block 510, the method 500 may return to block 504 in response the pressure switch or static noise switch being activated. The method 500 may then proceed as previously described.

Figure 6:
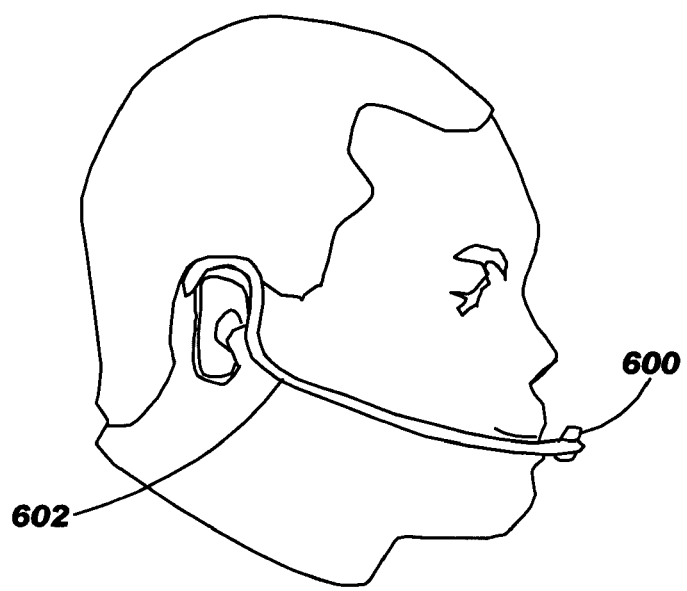
FIG. 6 is an example of another device for hands-free push-to-talk operation or functionality shown mounted in a headset in accordance with a further embodiment of the present invention.

FIG. 6 is an example of another device 600 for hands-free push-to-talk operation or functionality shown mounted in a headset 602 in accordance with a further embodiment of the present invention. The device 600 may be a pressure switch or static noise switch that may be used in conjunction with the method 500. The device 600, pressure switch or static noise switch may correspond to the PTT sensor or switch 102 described with respect to FIG. 1. A user may blow or generate a static or white noise or some other pressure on the device 600 to activate the PTT feature. While the device 600 has been described as being mounted in a headset for hands-free operation, the device 600 may be mounted anywhere or on any accessory or component that would facilitate a user generating a pressure on the device or generating a static, white noise or some other predetermined audible signal or sound.

Elements of the present invention may be embodied in hardware and/or software as a computer program code that may include firmware, resident software, microcode or the like. Additionally, elements of the invention, such as methods 200, 300, and 500 of FIGS. 2, 3 and 5, respectively, may take the form of a computer program product on a computer-usable or computer-readable storage medium having computer-usable or computer-readable program code embodied in the medium for use by or in connection with a device or system, such as communication device 100 of FIG. 1 or devices 400 and 600 of FIGS. 4A, 4B and 6. Examples of such a medium may be illustrated in FIG. 1 as network 134, medium 126 storage device 132 or similar devices. A computer-usable or readable medium may be any medium that may contain, store, communicate or transport the program for use by or in connection with a device or system. The medium, for example, may be an electronic, magnetic, optical, electromagnetic, infrared or semiconductor system or the like. The medium may also be simply a stream of information being retrieved when the computer program product is "downloaded" through a network such as the Internet. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A device for hands-free push-to-talk functionality, comprising:
   a hands-free push-to-talk sensor or switch including at least one of an air pressure sensitive switch, and a tilt sensor for sensing a change in a direction of force due to gravity on the tilt sensor when the tilt sensor is tilted more than a predetermined angle from a zero or normalized angle, wherein the hands-free push-to-talk sensor or switch is operable by at least one of the air pressure sensitive switch sensing a change in air pressure and the tilt sensor sensing a change in the direction of force due to gravity on the tilt sensor when the tilt sensor is tilted more than the predetermined angle from the zero or normalized angle;
   means to control operation of a communications device in response to signals from the push-to-talk sensor or switch, wherein the push-to-talk sensor or switch comprises the tilt sensor, wherein a transmit mode of the communications device is activated in response to the tilt sensor being tilted more than the predetermined angle from the zero or normalized angle of the direction of force due to gravity for a predetermined time duration; and
   means for maintaining the communications device in the transmit mode in response to at least one of detecting a voice signal or the tilt sensor being tilted more than the predetermined angle after a selected time delay.

2. The device of claim 1, further comprising means for switching the communications device to one of a receive mode or standby mode in response to an absence of at least one of detecting a voice signal or the tilt sensor being tilted more than the predetermined angle after a selected time delay.

3. The device of claim 1, wherein the push-to-talk sensor or switch comprises the air pressure sensitive switch, wherein a transmit mode of the communications device is activated in response to the user blowing on the air pressure sensitive switch with an air pressure greater than a preset air pressure.

4. The device of claim 3, further comprising means for maintaining the communications device in a transmit mode in response to at least one of detecting a voice signal or the air pressure greater than the preset air pressure caused by the user blowing on the air pressure sensitive switch after a selected time delay.

5. The device of claim 3, further comprising means for switching the communications device to one of a receive mode or standby mode in response to an absence of at least one of detecting a voice signal or the air pressure greater than the preset air pressure after a selected time delay.

6. The device of claim 1, wherein the communications device is a wireless communications device.

7. The device of claim 1, wherein the communications device is one of a radio, a cellular phone, a cordless phone, a personal digital assistant and a computer.

8. The device of claim 1, further comprising a headset, wherein the push-to-talk sensor or switch is mounted to the headset.

9. A method for hands-free push-to-talk functionality, comprising:
   detecting at least one of a tilt angle caused by a change in a direction of force due to gravity on a tilt sensor when the tilt sensor is tilted by more than a predetermined angle from a zero or normalized angle for a predetermined time duration, or air pressure;
   controlling operation of a communications device in response to detecting a presence or absence of at least one of the tilt angle caused by the change in the direction of force on the tilt sensor due to gravity when the tilt sensor is tilted by more than the predetermined angle from the zero or normalized angle for the predetermined time duration, or the change in air pressure;
   maintaining the communications device in the transmit mode in response to at least one of detecting a voice signal or detecting the tilt sensor being tilted more than the predetermined angle after a selected time delay; and
   switching or maintaining the communications device in one of a receive or standby mode in response to an absence of at least one of a voice signal or detecting the tilt sensor being tilted more than the predetermined angle after the selected time delay.

10. The method of claim 9, further comprising activating a transmit mode in the communications device in response to detecting the tilt sensor being tilted more than the predetermined angle from the normalized angle for the predetermined duration.

11. The method of claim 9, further comprising detecting an air pressure greater than a preset air pressure being blown on an air pressure sensitive switch by the user.

12. The method of claim 11, further comprising activating a transmit mode in the communications device in response to detecting the air pressure greater than the preset air pressure being blown on the air pressure sensitive switch by the user.

13. The method of claim 12, further comprising:
   maintaining the communications device in the transmit mode in response to at least one of detecting a voice signal or the air pressure greater than the preset air pressure after a selected time delay; and switching or maintaining the communications device in one of a receive or standby mode in response to an absence of at least one of a voice signal or the air pressure greater than the preset air pressure after the selected time delay.

14. A non-transitory computer-readable medium having computer-executable instructions for performing a method, comprising:
    detecting at least one of a tilt angle caused by a change in a direction of force on a tilt sensor due to gravity when the tilt sensor is tilted more than a predetermined angle from a zero or normalized angle for a predetermined time duration, or air pressure;
    controlling operation of a communications device in response to detecting a presence or absence of at least one of the tilt angle caused by the change in the direction of force on the tilt sensor due to gravity when the tilt sensor is tilted more than a predetermined angle from a zero or normalized angle for the predetermined time duration, or the change in air pressure;
    maintaining the communications device in the transmit mode in response to at least one of detecting a voice signal or detecting the tilt sensor being tilted more than the predetermined angle after a selected time delay; and
    switching or maintaining the communications device in one of a receive or standby mode in response to an absence of at least one of a voice signal or detecting the tilt sensor being tilted more than the predetermined angle after the selected time delay.

15. The computer-readable medium having computer executable instructions for performing the method of claim 14, further comprising activating a transmit mode in the communications device in response to detecting the tilt sensor being tilted more than the predetermined angle from the normalized angle for the predetermined duration.

16. The computer-readable medium having computer executable instructions for performing the method of claim 14, further comprising detecting an air pressure greater than a preset air pressure being blown on an air pressure sensitive switch by the user.

17. The computer-readable medium having computer executable instructions for performing the method of claim 16, further comprising activating a transmit mode in the communications device in response to detecting the air pressure greater than the preset air pressure being blown on the air pressure sensitive switch by the user.

18. The computer-readable medium having computer executable instructions for performing the method of claim 17, further comprising:
    maintaining the communications device in the transmit mode in response to at least one of detecting a voice signal or the air pressure greater than the preset air pressure after a selected time delay; and
    switching or maintaining the communications device in one of a receive or standby mode in response to an absence of at least one of a voice signal or the air pressure greater than the preset air pressure after the selected time delay.

19. A device for hands-free push-to-talk functionality, comprising:
    a hands-free push-to-talk sensor or switch including at least one of an air pressure sensitive switch, and a tilt sensor for sensing a change in a direction of force due to gravity on the tilt sensor when the tilt sensor is tilted more than a predetermined angle from a zero or normalized angle, wherein the hands-free push-to-talk sensor or switch is operable by at least one of the air pressure sensitive switch sensing a change in air pressure and the tilt sensor sensing a change in the direction of force due to gravity on the tilt sensor when the tilt sensor is tilted more than the predetermined angle from the zero or normalized angle;
    means to control operation of a communications device in response to signals from the push-to-talk sensor or switch, wherein the push-to-talk sensor or switch comprises the tilt sensor, wherein a transmit mode of the communications device is activated in response to the tilt sensor being tilted more than the predetermined angle from the zero or normalized angle of the direction of force due to gravity for a predetermined time duration; and
    means for switching the communications device to one of a receive mode or standby mode in response to an absence of at least one of detecting a voice signal or the tilt sensor being tilted more than the predetermined angle after a selected time delay.

20. The device of claim 19, further comprising means for maintaining the communications device in the transmit mode in response to at least one of detecting a voice signal or the tilt sensor being tilted more than the predetermined angle after a selected time delay.

21. The device of claim 19, wherein the push-to-talk sensor or switch comprises the air pressure sensitive switch, wherein a transmit mode of the communications device is activated in response to the user blowing on the air pressure sensitive switch with an air pressure greater than a preset air pressure.

22. The device of claim 21, further comprising means for maintaining the communications device in a transmit mode in response to at least one of detecting a voice signal or the air pressure greater than the preset air pressure caused by the user blowing on the air pressure sensitive switch after a selected time delay.

23. The device of claim 21, further comprising means for switching the communications device to one of a receive mode or standby mode in response to an absence of at least one of detecting a voice signal or the air pressure greater than the preset air pressure after a selected time delay.

24. The device of claim 19, wherein the communications device is a wireless communications device.

25. The device of claim 19, wherein the communications device is one of a radio, a cellular phone, a cordless phone, a personal digital assistant and a computer.

26. The device of claim 19, further comprising a headset, wherein the push-to-talk sensor or switch is mounted to the headset.

* * * * *